US006717131B2

(12) United States Patent
Holle et al.

(10) Patent No.: US 6,717,131 B2
(45) Date of Patent: Apr. 6, 2004

(54) CLEAN DAUGHTER-ION SPECTRA USING TIME-OF-FLIGHT MASS SPECTROMETERS

(75) Inventors: Armin Holle, Oyten (DE); Aurelio La Rotta, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 24 days.

(21) Appl. No.: 10/268,046

(22) Filed: Oct. 9, 2002

(65) Prior Publication Data

US 2003/0089848 A1 May 15, 2003

(30) Foreign Application Priority Data

Oct. 15, 2001 (DE) ........................................ 101 50 559

(51) Int. Cl.[7] ................................................ B01D 59/44

(52) U.S. Cl. ....................... 250/282; 250/282; 250/287; 250/286; 250/281

(58) Field of Search ................................ 250/282, 287, 250/286, 281

(56) References Cited

U.S. PATENT DOCUMENTS

| | | | | | |
|---|---|---|---|---|---|
| 5,654,545 A | * | 8/1997 | Holle et al. | ................. | 250/287 |
| 5,864,137 A | * | 1/1999 | Becker et al. | .............. | 250/287 |
| 6,489,610 B1 | * | 12/2002 | Barofsky et al. | ........... | 250/287 |

FOREIGN PATENT DOCUMENTS

| | | |
|---|---|---|
| DE | 2 375 654 | 3/1997 |
| DE | 196 38 577 C1 | 1/1998 |
| DE | 198 56 014 A1 | 7/2000 |
| DE | 100 34 074 A1 | 1/2002 |
| DE | 2 303 962 | 11/2002 |

OTHER PUBLICATIONS

L'Hermite et al. "A New Method to Study Metastable Fragmentation of Clusters Using a Reflectron Time–Of–Flight Mass Spectrometer, Review of Scientific Instruments", 0034–6748/2000/71(5)/2033/5, ( 2000 ).*

J.M. L'Hermite et al., "A new method to study metastable fragmentation of clusters using a reflectron time–of–flight mass spectrometer", Review of Scientific Instruments, May 2000, vol. 71, No. 5, pp. 2033–2037, France.

* cited by examiner

*Primary Examiner*—John R. Lee
*Assistant Examiner*—Zia R. Hashmi

(57) ABSTRACT

The invention relates to methods and instruments for measuring daughter-ion spectra in reflector time-of-flight mass spectrometers with post-acceleration of parent and daughter ions selected by means of a parent-ion selector. The invention consists of using a second selector to mask out all or at least a large fraction of the parent ions as well as those metastable daughter ions, which are produced by the decomposition of parent ions after post-acceleration. These ions not only produce 'ghost' peaks but also a high level of background noise as well as a parent ion peak which is excessively saturated and cannot be evaluated. This peak's ion current is capable of damaging the detector. The remaining small fraction of parent ions or the special addition of a small portion of parent ions, practically free of metastable ions, to the daughter ion spectra, produce a parent ion peak which can be used as a mass reference for a mass calculation to correct all instrument and control-related effects on the mass calculation.

13 Claims, 1 Drawing Sheet

CLEAN DAUGHTER-ION SPECTRA USING TIME-OF-FLIGHT MASS SPECTROMETERS

FIELD OF THE INVENTION

The invention relates to methods and instruments for measuring daughter-ion spectra in reflector time-of-flight mass spectrometers with post-acceleration of parent and daughter ions selected by means of a parent-ion selector.

BACKGROUND OF THE INVENTION

The mass-to-charge ratio m/z of ions can be determined from their flight time in a time-of-flight mass spectrometer. For the sake of simplicity, only the mass m and its determination will be referred to in the following even though the measurement of the mass to charge ratio m/z, where z is the number of elementary charges carried by the ion, is always used in mass spectrometry. Since many types of ionization, such as Matrix-Assisted Laser Desorption and Ionization (MALDI), in the main produce only singly charged ions (z=1), the differences between m/z and m cease to be relevant for these forms of ionization.

The daughter ion or fragment ion spectra of parent ions which are selected by an ion selector on the basis of their time of flight can be measured in a time-of-flight mass spectrometer which has been fitted with an ion selector and a velocity-focusing reflector. The decomposition of parent ions into daughter ions or fragment ions can be produced by two different processes: firstly, by introducing excess energy while they are being ionized during laser bombardment ('LID' Laser Induced Decomposition), where so-called 'metastable' ions are produced which partially decompose as they travel through the mass spectrometer and secondly, by Collisionally Induced Decomposition (CID), which essentially leads to spontaneous decomposition, where somewhat different fragmentation rules prevail, such as the loss of side chains.

The reflector which has now gained general acceptance is the Mamyrin velocity-focusing, two stage reflector. In the first deceleration stage of the reflector, the ions are decelerated sharply, but in the second stage only weakly. Faster ions with the same mass as slower ions penetrate further into the relatively weak linear deceleration field of the second stage and therefore cover a somewhat longer distance which, by correct adjustment of the two deceleration fields, can compensate for the faster speed of the ions with the same mass emerging from a primary focus so that they arrive at the secondary focus at exactly the same time.

As well as the velocity focusing of ions with the same mass, there is energy dispersion for ions with the same velocity but with different masses. If the parent ions and the daughter ions which arise from the decomposition of parent ions enter the reflector simultaneously and with the same velocities, and therefore with different mass-dependent energy levels, they will be dispersed in the reflector by their different energies in accordance with their masses. This dispersion can be used for measuring the daughter ions.

However, the method of detecting daughter ions or fragment ions using reflectors such as these has serious disadvantages. When focusing is reasonably good, only ions with a relatively low relative energy range can be detected—in the standard commercially available instruments, approximately 25–30% of the energy (and mass) range under adjustment. Thus, for a medium-sized peptide, approximately 10–15 spectral segments have to be acquired if the entire fragment spectrum of the low masses of individual ionized amino acids up to the mass of the parent ions is to be measured. All these spectral segments have to be co-ordinated with each other using a complex mass-calibration process. Only then can the spectral segments be assembled in a data system to produce an artificially generated composite spectrum.

In the patent DE 198 56 014 C2 (U.S. Pat. No. 6,300,627), ways are described for recording daughter-ion spectra in a time-of-flight mass spectrometer with a two-stage reflector using a single non-segmented spectral scan. The patent also discloses other information regarding the MALDI ionization method and velocity focusing by delayed acceleration in the ion source. This method not only saves time when scanning the spectrum but also requires lower sample consumption, and this means that the sensitivity is significantly higher.

The method described in patent DE 198 56 014 C2 is based on the fact that the selected ions are post-accelerated so that they all fit within the energy window of the reflector. One of the methods suggested consists of only slightly accelerating the ions in an ion source with delayed acceleration, allowing them to decompose in an initial drift region, very rapidly raising them to a second acceleration potential using a potential cell ('potential lift') and accelerating them in subsequent acceleration sections to a second drift region. The second drift region can be at the same potential as the first drift region. In the preferred embodiment, the two drift regions are operated at ground potential. In the second drift region, very light ions then have a minimum energy which provides the second acceleration potential; the parent ions which have not decomposed have a maximum energy corresponding to the sum of the first and second acceleration. If a reflector is able to reflect particles with energy deviations corresponding to approximately 30% of the maximum energy, and if about 70% of the total energy is provided by the second acceleration potential, then the reflector can reflect all the daughter ions simultaneously. In this case scanning of the entire daughter-ion spectrum without any segmentation is possible.

At the same time, the potential lift itself can be used as the selector for selecting the parent ions for the daughter-ion spectrum. For much better results, an additional selector must be used, which will provide significantly better time resolution for the parent ions.

A prior art, optimized method for scanning daughter-ion spectra using time-of-flight mass spectrometers will appear as follows.

Ions are produced by the formation of a vapor cloud by laser bombardment focused onto a sample carrier of a solid sample containing analyte molecules embedded in a matrix substance. Due to the explosive expansion of the cloud in the vacuum, the ions have slightly different location-dependent, initial velocities. After a time delay, an acceleration field is switched on where, according to patent U.S. Pat. No. 5,654,545, for example, temporal focusing of the ions with a single mass but different initial speeds can be achieved at an adjustable location. The intermediate velocity is focused exactly on the location of the parent-ion separator, where the parent ions arrive, time-focused and at exactly the same time, so that high mass resolution can be achieved for the selection of a parent ion type. According to patent DE 196 38 577 C2 (U.S. Pat. No. 5,969,348), by using a temporal pulse profile for the acceleration field, it is possible to have the focal points for all the masses at the same location, i.e. in the parent-ion selector.

By means of a high energy density at the focal point of the laser, a high proportion of metastable ions ranging from a few tenths to a few percent can be achieved. In other words, these ions decompose to daughter ions and neutral particles as they travel through the mass spectrometer with a certain half-life. The daughter ions travel at the same speed as the parent ions. They are allowed through by the parent-ion separator at the same time as the parent ions but all other ions are masked out.

On leaving the parent-ion separator, the parent ions and daughter ions travel on to the potential lift and then drift slightly apart again due to small difference in the initial velocities. When they are in the potential lift cell, the potential is raised in a very short time. From here, they travel into the first acceleration path, which at this point has no field and is at the same potential. When transfer of the ions into the field-free acceleration path is complete, an acceleration potential is applied which, because of the location and velocity correlation of these ions, temporally focuses the ions of the same mass but different initial velocity as described in Patent Application DE 100 34 074.1. Final post acceleration is provided by a second acceleration path. The field strength of the first acceleration path is chosen so that, after passing through the ion reflector, the focal point lies precisely on the ion detector to achieve high mass resolution.

However, this relatively complex arrangement still has disadvantages. Metastable parent ions not only decompose before the potential lift but also after it. Although the rate of decomposition decreases exponentially with time, significant quantities of daughter ions are nevertheless produced in this region because the drift region up to the reflector is very long. The ions decomposing between the potential lift and the reflector produce slightly blurred peaks in the daughter ion spectrum. Although these can, in principle, be filtered out of the spectrum by calculation, they significantly reduce the quality of the spectrum.

The ions which are then produced by decomposition as they travel in the reflector are reflected without being focused and arrive at the ion detector at completely indeterminate times. They form a hump-type background noise extending over half the spectrum to the peak produced by non-decomposed parent ions. Because of the complete deceleration and re-acceleration of the ions, the decomposing parent ions remain in the reflector a long time. This is the reason for the significant amount of background noise.

Since only a small proportion of the parent ions in the mass spectrometer decompose into metastable ions before reaching the ion detector, the intensity of the peak produced by the parent ions is greater than that of all the other peaks by a factor between 10 and 10,000. This peak is therefore not only very high and saturates the electronic amplifiers but is also extremely wide since the feet of the peak are also raised. This creates an enormous amount of interference in the daughter ion spectrum and puts the secondary electron amplifier at risk, causing it to operate in a saturated state and thus producing fatigue phenomena which interfere with the spectrum scans which follows. On the other hand, this parent ion peak is the only peak of the daughter-ion spectrum of known mass and could be used for mass correction in the daughter-ion spectrum if its shape were suitable for accurate mass determination.

Precise mass determination from the flight times of the ions in a daughter-ion spectrum which has been obtained in this way is, however, exceptionally difficult. Because of the different switching times of the acceleration paths in the ion source and post accelerator, not only do the voltages used, which may be subject to drift, have an effect but, because of the digital time control system, effects on the flight time are produced due to rounding up to the smallest integer number for the time-control steps which amount to, for example, 5 or 10 nanoseconds. Due to this rounding error, parent ions of different masses are able to enter different distances into the post-acceleration stage and this has an effect on the total flight time. It would, therefore, be advantageous to have a reference mass in the daughter-ion spectrum.

A MALDI time-of-flight mass spectrum is not normally produced by a single laser shot. For a good mass spectrum, 20–200 laser shots are usually necessary. The digitized time-of-light spectra obtained from each laser shot are totaled to give a single time-of-flight spectrum, which is then converted to a mass spectrum by converting the times of flight. This is true both for normal mass spectra and daughter-ion spectra. When reference is made to the scanning of daughter-ion spectra in the following, this means exclusively daughter-ion, time-of-flight sum spectra, i.e. totalled ion-currents recorded against the times of flight.

SUMMARY OF THE INVENTION

The basic idea of the invention is to mask out, fully or partially, the parent ions and those daughter ions which are produced from the parent ions after post-acceleration due to metastable decomposition and which are responsible for the ghost peaks, from the post-accelerated ion beam by using a second ion selector. For masking to take place, there must be sufficient mass dispersion, i.e. a sufficiently long flight path must lie between post-acceleration and the second selector. For good mass resolution, the velocity focus of the post-acceleration path should be located in the second selector and the velocity-focusing reflector should image the velocity focal point onto the detector.

To obtain an optimum imaging of the velocity focus by the reflector onto the detector, however, it would be necessary to maintain a significant drift region between the intermediate velocity focal point and the reflector. With the two intermediate velocity focal points and the optimum imaging by the reflector, the entire mass spectrometer would then be extremely long and unmanageable. Fortunately, however, the mass resolution of the second ion selector does not need to be too high. The parent ions are the heaviest and slowest ions of the daughter-ion spectrum and form the rearguard of the group of ions in a daughter ion spectrum. Since there are no heavier ions, single-sided removal of the heavy parent ions is sufficient, which reduces the requirements in terms of mass resolution.

This type of mass spectrometry is mainly used in proteomics, in other words, one of the main uses of the instrument is found in the analysis of proteins and peptides. Here, it is the heaviest daughter ion which is of significant interest is the one with an amino acid split off. It is therefore at least approximately 70 atomic mass units lighter than the parent ions. This means that a high mass resolution and second velocity focus in the second selector is not necessary, so that a more conveniently sized instrument is possible.

However, by fully masking out the parent ions, the only peak which could be used as the mass reference is lost. Another idea of the invention therefore is to mask out only the overwhelming part of the parent ions or to introduce a parent-ion peak back into the daughter-ion sum spectrum but in such a way that practically no metastable ions are produced to give ghost peaks or background noise and any overdriving of the amplifier is avoided. Partial masking out can be performed by strong defocusing, e.g. by a lens. Full masking out can be achieved by a selector type in form of a multi-condensor like that of the parent ion selector. For the purpose of re-introducing a parent ion peak, a few individual spectra are acquired which only contain parent ions but with only a small ion beam intensity and without saturation. With MALDI spectra, the laser energy is regulated down by an attenuator so that practically no metastable ions are produced and, by switching off the masking system on the second selector, no saturated peak appears. By using only a few laser shots of this type, several separate spectra are acquired which contain practically only a single parent-ion peak. These spectra are added to the daughter-ion spectra in order to provide them with a parent-ion peak which is ideal as a reference for evaluation.

By using the parent ion peak as mass reference, the times of flight of the ions in the daughter-ion spectrum which have mainly been obtained from daughter ions by using non-attenuated laser shots and masking out the parent ions, can be converted into masses with outstanding results.

BRIEF DESCRIPTION OF THE DRAWING

FIG. 1 shows an embodiment of the time-of-flight mass spectrometer according to this invention with an ion source (1) which, due to the grids (2) and (3), contains two acceleration regions for velocity focusing. The first ion selector (4) makes it possible to select the desired ions. The potential lift then consists of two grids (5) and (6) which, in this example, are set at the same potential. This can be switched to a high voltage when the desired ions pass through. Here also, there are two acceleration regions for velocity focusing on account of the two grids (7) and (8). After this, there is a second ion selector (9) for masking out the parent ions. The grids (10), (11) and (12) form the two-stage reflector, which energy focuses the ions onto the detector (13). The second ion selector (9) also may have the form of a strongly defocusing lens which, in connection with an aperture somewhere downstream, masks out an overwhelming part, say for instance 99.9%, of the ion beam, if its voltage is switched on.

DETAILED DESCRIPTION

Figure 1:
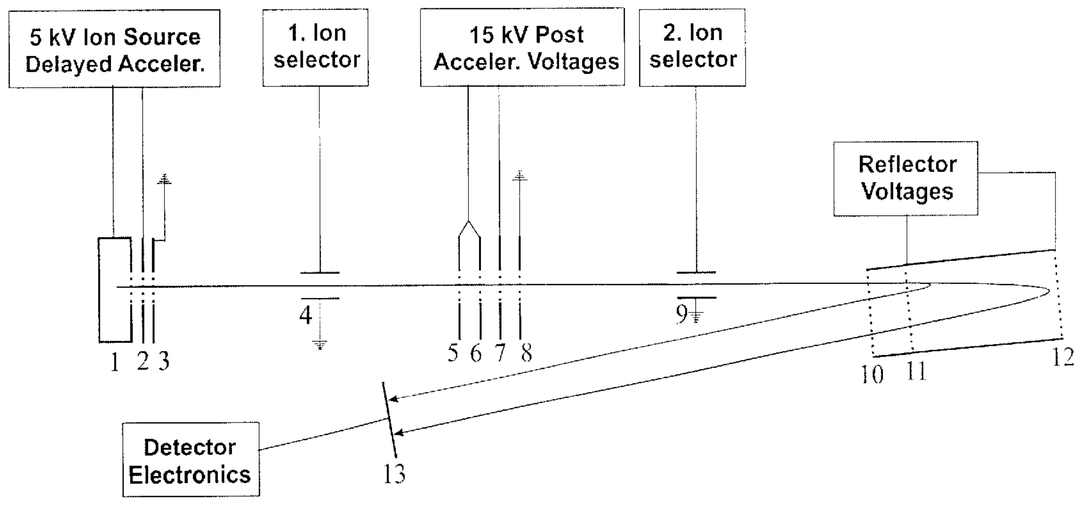

Ions produced by matrix-assisted laser desorption are accelerated in the ion source (1, 2, 3) using only a moderate amount of energy, such as 5 kV. They therefore pass through the first field-free drift region between the ion source (1, 2, 3) and the potential lift (5, 6, 7, 8) relatively slowly and many of the ions can decompose by metastable decay due to the excess energy which they acquired during ionization. Metastable decomposition can be increased considerably by only slightly increasing the laser power.

By integrating a collision chamber (not shown in FIG. 1), which is filled with a collision gas, it is possible to produce collisionally induced fragment ions instead of just the metastable fragment ions. In this case, any ion source can be used which produces ions in pulses—they do not have to be MALDI ions.

The delayed acceleration between the grids (1) and (2) of the ion source is adjusted so that the parent ions and the daughter ions which are to be selected and which travel at the same velocity are velocity focused precisely in the ion selector (4). This produces good time resolution for both parent ions and daughter ions. By pulsing the acceleration after applying it, the velocity focal points for all masses can be placed exactly in the parent-ion selector without readjusting the switch voltage. The parent ions are then selected merely by selecting the switching time for the parent-ion selector, as described in principle in DE 196 38 577 C2.

However, the ion source does not have to be formed out of grids; ion sources which operate exceedingly well are available without any grids at all.

As they travel further, the selected parent ions and the fragment ions which have been produced by decomposition enter the first region of the potential lift between the grids (5) and (6) which, in this example, are short-circuited to each other and are kept at ground potential, the potential of the first drift region. In the meantime, grid (7) is set at an adjustable post-acceleration potential of approximately 15 kV; grid (8) is permanently at ground potential, i.e. the potential of the second drift region after the potential lift. At the moment when the ions pass between grids (5) and (6) of the potential lift, these grids are switched to the high post-acceleration potential of approximately 15 kV.

After the potential switching has finished, the selected ions now travel into the space between the grids (6) and (7) where there is no potential field—the faster ions of all masses being slightly ahead and the slower ions behind. There is a correlation between the location and the speed of the ions which is used as a basis for velocity focusing by the acceleration which follows. Acceleration is switched on by reducing the potential at grid (7).

Velocity focusing may be directed towards the second ion selector (9) by chosing the right potential at grid (7). It may, however, be advantageous to direct the focusing through the reflector with grids (10, 11 and 12) towards the detector (13). In this case, the post-acceleration device (5, 6, 7, 8) and the reflector (10, 11, 12) produce a combined focusing effect for the velocity. According to DE 196 38 577 C2, dynamic shaping of the acceleration potential after it has been switched on makes it possible for the velocity focal points for all masses in the spectrum to be located on the detector to produce a consistently sharp daughter-ion spectrum ranging from the lightest daughter ions to the parent ions.

In principle, this post-acceleration path can also be set up without grids. In addition, the post-acceleration unit with its four grids can be removed from the path of the ion beam entirely in order to obtain maximum power for the spectrometer for scanning the original spectra (i.e. not the daughter-ion spectra).

The second ion selector may operate in two ways, depending on its design: it either may mask out the parent ions completely, or it may mask out only an overwhelming part of the parent ions, letting a few parent ions reach the detector to form a weak reference mass peak.

If a selector is used which is designed in exactly the same way as the parent-ion selector, the second ion selector completely masks out the parent ions and those daughter ions which are produced after post-acceleration. This so-called Bradbury-Nielson selector is usually a short device built from many condenser shutters, applied with voltages of alternate polarities.

A daughter-ion spectrum acquired in this way contains no parent ions at all. Since the parent ions are the only ions for which the mass is known, there is no longer an ion peak which can be used as a mass reference for converting the measured times of flight in the daughter-ion spectrum into the associated masses. Calculation from the set voltages and the switching times alone is very unreliable and leads to large errors. Even rounding up to the whole values for the smallest time units when calculating the switching times for the ion-source acceleration, parent ion selector, potential lift and post-accelerator leads to incalculable errors which can only be corrected in their complex summation by using a mass reference. Due to these rounding errors, experimental calibration always produces jumps when switching to another parent-ion mass.

It is therefore advisable to have parent-ion peaks which can be evaluated accurately in the daughter-ion spectrum. Here, peaks which can be evaluated accurately means narrow, sharp peaks which are not saturated. As well as this, the ghost peaks which normally appear with parent ions should remain suppressed.

According to the invention, it is now possible to add several individual spectra for parent ions in non-saturated numbers and essentially without metastable ions to the sum spectrum for the daughter ions. In principle, this can be achieved by reducing the ionization power in the ion source, thereby suppressing the production of metastable ions, and switching off the masking out of parent ions. For the production of ions by MALDI, the energy density in the laser focus can be reduced by an attenuator for this purpose. Such an attenuator is available in every MALDI time-of-flight mass spectrometer. Reducing the energy density produces very much reduced ion formation and practically no formation of metastable ions. The associated spectra contain almost only parent ions and in numbers which do not saturate the detector.

The method thus provides for the addition of several individual spectra with reduced laser energy densities and without masking out the parent ions before or after scanning the individual daughter-ion spectra added together to form a daughter-ion sum spectrum with non-attenuated laser energy density and with the parent ions masked out. The daughter-ion sum spectrum then contains a group of peaks for the parent ions including their isotopes which can be used for mass correction. Usually the mass of the parent ions is determined very precisely in a previous spectrum of unfragmented ions and is therefore known.

The alternate method is to reduce the strength of the parent ion peak by deflecting only a part of the parent ions. This effect can be achieved by a strongly defocusing Einzel lens, the defocusing of which is switched on only at the moment in which the parent ions pass the lens. If the parent ion intensity is reduced by a factor of 1000 or more, ghost peaks and noise signals are reduced by the same amount: they usually are no longer visible. This method corrects the masses even when the adjusted voltages slowly drift under conditions such as temperature changes.

There are many variations on the method described for the acquisition of daughter-ion spectra and the apparatus used for this purpose. Thus, in particular, the ion source, the potential lift and/or the reflector can be set up without grids, which improves the sensitivity and mass resolution. By using a grid-free reflector which, because of the lens effect at the entrance area, focuses the ion beam both in terms of space and velocity, light ions and heavy ions together can be guided more efficiently to a detector with a smaller surface area than to the detector shown in FIG. 1 containing grids.

In particular, a mass spectrometer according to the invention can be used for identifying proteins and recognizing mutated proteins or proteins which have been altered in some other way. To do this, the proteins are first digested using an enzyme such as trypsin. A spectrum acquisition of the digest peptide mixture using MALDI for the ionization produces a so-called ‘fingerprint spectrum’ which can be used for immediate identification of the protein using protein-sequence databases. If this does not provide clear identification, or if some of the peptides do not tally with the masses from the database, then daughter-ion spectra can be obtained immediately from the peptides. Acquisition of a daughter-ion spectrum takes no more time than acquiring a fingerprint spectrum. The daughter-ion spectrum will clarify identification or show up differences to the sequence in the database which are caused by mutation or post-translational modifications. All these analyses can be carried out without removing the sample from the mass spectrometer.

Of course, quite different embodiments of time-of-flight mass spectrometers can be fitted with a second selector according to the invention for suppressing the post-accelerated parent ions, such as time-of-flight mass spectrometers with more than one reflector. The installation or equipping of such devices or use of methods such as these will be possible for any specialist in mass spectrometry with knowledge of this invention.

What is claimed is:

1. A method for the acquisition of spectra of fragment ions, produced by metastable decay or collisionally induced decomposition in a reflector time-of-light mass spectrometer, the method comprising:

selecting parent ions with a parent-ion selector in the spectrometer;

providing post-acceleration of the remaining parent ions and fragment ions to be examined;

masking out of the detected ion beam at least a portion of the parent ions remaining after post-acceleration using a second ion selector and detecting the post-accelerated ion beam with said time-of-flight mass spectrometer.

2. A method according to claim 1 further comprising recording daughter ion spectra in which the parent ions are fully masked out and combining them with parent ion spectra in which there is no masking of the post-accelerated parent ions.

3. A method according to claim 2 wherein the ions are produced by matrix-assisted laser desorption and ionization and the non-masked spectra are acquired using attenuated laser energy.

4. A method according to claim 1 wherein the parent ions are only partially masked out using a second ion selector that comprises a strongly defocusing lens.

5. A method according to claim 1 wherein post acceleration with velocity focusing is used.

6. A method according to claim 5 wherein velocity of ions of the same mass is focused on the second selector.

7. A method according to claim 5 wherein velocity of ions of the same mass is focused on the detector.

8. A method according to claim 1 further comprising dynamically altering acceleration potentials during said post-acceleration after switching on an acceleration field in such a way that velocity focusing occurs for the parent ions and for all their fragment ions at a detector over a full range of masses.

9. A time-of-flight mass spectrometer comprising:

(a) an ion source with at least two ion-acceleration regions;

(b) a parent ion selector for selecting parent ions;

(c) a post-acceleration unit with at least two post-acceleration regions for providing post-acceleration of the parent ions;

(d) a second ion selector for masking at least a portion of the parent ions after post-acceleration; and (e) an ion detector for detecting the post-accelerated ion beam in said time-of-flight mass spectrometer.

10. A time-of-flight mass spectrometer according to claim 9 wherein at least one of the parent ion selector, the post acceleration unit and the second selector can be removed from the flight path of the ions.

11. A time-of-flight mass spectrometer according to claim 9 further comprising a reflector that redirects ions toward the detector.

12. A time-of-flight mass spectrometer according to claim 9 further comprising a velocity focuser that provides velocity focusing of the post-accelerated ions.

13. A time-of-flight mass spectrometer according to claim 9 wherein the second ion selector comprises a strongly defocusing lens.

* * * * *